Sept. 9, 1952 E. KOLISCH 2,610,284
ELECTRIC PERCOLATOR
Filed March 23, 1950
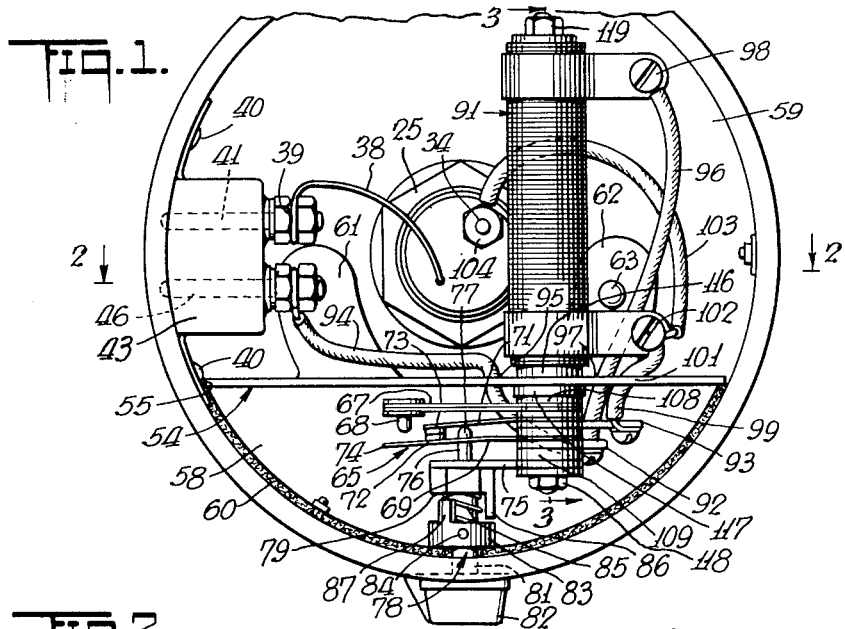
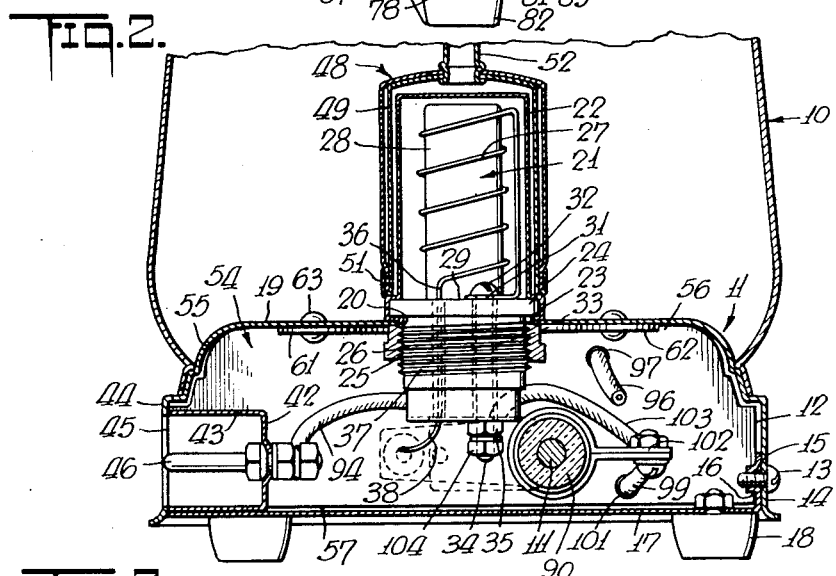
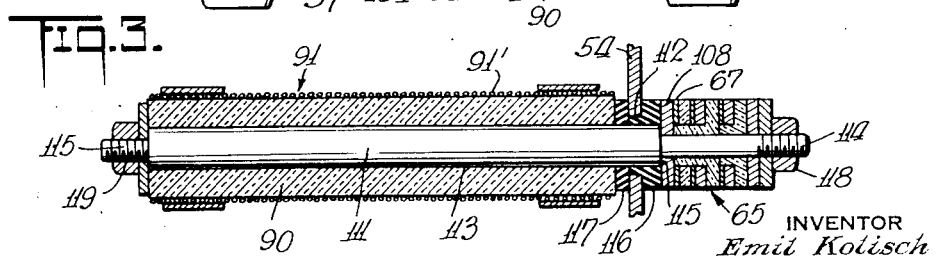
INVENTOR
*Emil Kolisch*
BY
*Dean Fairbank & Hirsch*
ATTORNEYS Patented Sept. 9, 1952

2,610,284

UNITED STATES PATENT OFFICE 2,610,284

ELECTRIC PERCOLATOR

Emil Kolisch, New York, N. Y., assignor to Continental Silver Co., Inc., a corporation of New York Application March 23, 1950, Serial No. 151,483

7 Claims. (Cl. 219—44)

The present invention is concerned with electric percolators of the automatic type.

As conducive to a clear understanding of the invention, it is noted that the controlling adjustable thermostat of such percolators is subject to a number of factors that, in the absence of special and costly adjustments of each of the percolators at the factory, spell objectionable and fortuitous variation in the temperature and strength of coffee at cut-off of the thermostat, these factors, including among others, tolerance in the wattage of the electric heater, tolerance in the portion of the electric heater below the base of the receptacle, variations in commercial mass production assembly including tolerance in the position of the electric heater relative to the thermostat, variations in the applied line voltage and variations in the temperature and movement of the ambient air.

It is accordingly among the objects of the invention to provide an electric percolator of the above type of relatively simple, compact and rugged construction, of few parts, substantially all of which are conventional, in which the selected strength of coffee is reliably obtained with substantial uniformity in all percolators of any particular model made in mass production, with practical elimination of such divergences from the strength of coffee desired as might normally be expected due to variations in commercial mass production assembly including manufacturing tolerances in the electric heaters employed and in the distance of the thermostat from such heater and such variations in the line voltage and in the temperature and also movement of the ambient air as are incurred even under extreme conditions that may occur in use of the device in the home.

According to one feature of the invention, the thermostat is so arranged below the receptacle containing the coffee infusion, as to be substantially heat insulated against conduction or convection of heat from the electric heater and preferably also from the ambient air and to be subjected substantially only to the heat of the bottom of the receptacle which reaches the thermostat by convection, so that said thermostat will open only when the coffee infusion reaches the desired temperature, substantially regardless of the various otherwise disturbing factors above indicated.

To this end the thermostat is positioned in a control chamber having a relatively large heat radiating surface in relation to its small volume, in heat conductive relation to the liquid in the receptacle and the transfer of heat by radiation between the control chamber and the external air is effectively reduced for practice purposes by lining the externally exposed surface of the control chamber with insulation such as asbestos.

It is another object of the invention to provide an electric percolator which may utilize a conventional relatively inexpensive resistor that will provide enough heat after percolation has ceased, both to retain the coffee infusion at optimum drinking temperature by radiation and convection and to transmit heat by conduction to the thermostat in order to retain the latter in open position as long as the resistor is in circuit.

The latter object is attained by installing the resistor at the exterior of the small control chamber which resistor may be of size larger and therefore of cost less than one of the specialized design required to be so small as to be accommodated in said chamber, and has a metal core which extends through the wall of the control chamber, and serves as a conductor effectively to convey heat to the thermostat within the control chamber, for maintaining said thermostat open as long as the resistor is maintained in circuit.

According to another feature of the invention, the thermostat and resistor are incorporated in a sub-assembly on opposite sides of a partition affixed across the cavity of the base of the percolator and determining the small control chamber at the thermostat mounting side thereof, both the thermostat and the resistor being mounted in heat insulating relation with respect to said partition.

This application is a continuation in part of my co-pending application Serial No. 118,354, filed September 28, 1949.

In the accompanying drawings in which are shown one or more of various possible embodiments of the several features of the invention:

Fig. 1 is a bottom plan view of the percolator with the bottom plate removed,

Fig. 2 is a fragmentary transverse sectional view taken along line 2—2 of Fig. 1, and, Fig. 3 is a detail sectional view on a larger scale taken along line 3—3 of Fig. 1.

Referring now to the drawings, there is shown a preferred embodiment of a coffee percolator incorporating the temperature control sub-assembly. The percolator desirably comprises a receptacle 10 affixed to a hollow base 11 defining a cavity 12 therein. Screws 13 which pass through the rim 14 of the base 11 and are threaded into openings 15 in the upturned lugs 16 desirably formed integral with the periphery of the bottom plate 17, serve to secure the latter in place. Conventional legs 18 affixed to the bottom plate space the percolator from the table.

Carried by the top 19 of the base 11, which desirably serves as the floor of the receptacle, and extending through an opening 20 therein, is a heating element which includes a generally cylindrical, preferably a ceramic mount 21. A cylindrical protective housing 22 encompasses that portion of the mount which protrudes above top 19 and although it may be affixed to the latter in any suitable manner, illustratively has an inturned rim 23 extending under diametrically opposed laterally extending ears 24 integral with the mount 21. A nut 25 secured upon the threaded lower end 26 of the mount 21 which protrudes below top 19 into cavity 12, causes the ears 24 to be pressed against the inturned rim 23 of the housing 22, rigidly and securely to clamp the housing 22 and mount 21 to the base 11.

A resistance wire 27 is wound around the upper end 28 of the mount 21, which desirably is of reduced diameter forming an annular ledge 29. One end 31 of the wire 27 is desirably connected to the head of a bolt 32 which extends through a vertical bore 33 in ledge 29 and the lower portion of mount 21, with the lower end of bolt 32 protruding from the bottom of the mount as at 34, being secured in place by a nut 35.

The other end 36 of the resistance wire 27 passes through a vertical bore 37 in ledge 29 and the lower portion of mount 21 and extends from the bottom of the mount as at 38 and is connected as at 39 to a terminal plug 41. Plug 41 is rigidly affixed to and insulated from the end wall 42 of a socket 43 affixed to the side wall 44 of the base 11 as by rivets 40 over an opening 45 therein, as is the companion terminal plug 46.

A conventional cold water pump 48 is provided, desirably having a double wall well portion 49 with a small opening 51 therein and a tube 52 rising in said receptacle from said well 49 and mounting the conventional coffee basket (not shown).

The construction thus far described is not per se claimed herein as it is conventional.

According to the present invention a control chamber 58 is provided in the base 11 to house control equipment therein, and with as large a heat radiating surface compared to its volume as is practically possible. The control chamber may be formed by positioning in cavity 12, a transverse partition or plate 54 of aluminum alloy or other good heat conductive metal which divides the cavity 12 into two chambers, i. e., the smaller segmental chamber 58 and a large segmental chamber 59, the heating element 27 which is axial of the percolator extending at its lower end 26 wholly in said larger chamber. Plate 54 desirably has its lateral edges 55 shaped to correspond to the conformation of the inner lateral face of the wall of the base, so that when positioned in cavity 12 with the top edge 56 thereof, as shown in Fig. 2, substantially flush against the underface of the top 19 and at right angles thereto, the edges 55 will be but slightly spaced from the inner face of the wall of the base and the plate will extend as a chord across the cavity 12. The width of the plate 54 is preferably such that the bottom edge 57 thereof will be slightly spaced from the bottom plate 17.

Means are provided securely to affix the plate 54 in cavity 12 so as to provide for maximum heat transfer from the undersurface of top 19 to plate 54. Although plate 54 could be welded at its upper edge 56 to the adjacent top 19 of the base, in the embodiment herein shown, the plate 54 desirably has a pair of ears 61 and 62 preferably formed integrally with and extending laterally outward from said upper edge 56 into chamber 59 to lie flush against the under-surface of top 19, to which they are affixed preferably by rivets 63.

By the spacing set forth, the plate 54 is effectively heat insulated from the outer air and is subjected substantially solely to the heat of the percolator contents.

Chamber 58 is preferably insulated from variations in the temperature and movement of the external air by means of a thermal insulating shield 60 desirably of asbestos, positioned against the arcuate wall portion thereof which is part of the wall base 12.

To control the percolation cut-off, a thermostate 65 is positioned in chamber 58 and desirably comprises a bimetallic arm 67 carrying at its free end an insulating stud 68 extending at right angles thereto and desirably of ceramic material. Associated with bimetal arm 67 are a pair of resilient spring arms 69 and 71 of electrically conductive material, having contacts 72 and 73 on opposed faces thereof respectively, said spring arms 69 and 71 being stressed toward each other so that contacts 72 and 73 are normally in engagement.

Desirably one of said spring arms, illustratively arm 69, is of greater length than the other and protrudes therebeyond as at 74, such protruding end 74 being in the path of movement of stud 68.

Associated with the spring arms 69 and 71 is a support arm 75 of rigid material, on which an insulating stud 76 is adjustably mounted, with the end 77 thereof extending through an opening in spring arm 69 and normally abutting against the face of spring arm 71.

Stud 76 of thermostat 65 is desirably affixed in the end of a rod 78 which has a fine pitch thread for precise adjustment and is screwed into a nut 79 affixed to arm 75 and coaxial with an opening therein. The free end of rod 78 extends through an opening 81 (Fig. 1) in the side wall of the base 11 and has a knob 82 affixed to the protruding outer end thereof to facilitate rotary adjustment. Rod 78 desirably has a collar 83 affixed thereon by a set screw 84. Coil spring 85 encompassing rod 78 and compressed between the nut 79 and a shoulder (not shown) on such rod 78 holds the latch and the stud 76 controlled thereby in any position of adjustment.

In order to set the minimum and maximum range of thermostat 65 for mild and extra strong coffee respectively, nut 79 has an outstanding finger 86 desirably formed integrally therewith which serves to limit the movement of stop 87 formed integrally with collar 83.

Associated with thermostat 65 and positioned externally of control chamber 58 in chamber 59, is a resistor 91 desirably of the type having a tubular ceramic body 90 on the outer surface of which the resistance wire 91' is wound. To connect the thermostat 65, heating element 27 and resistor 91 in circuit, spring arm 69 of thermostat 65, is connected by lead 94 affixed to end lug 92, which lead extends through an opening 95 in plate 54, to terminal plug 46, and by lead 96 which extends through opening 97 in plate 54, to terminal 98 of resistor 91. Spring arm 71 is connected by lead 99 affixed to end lug 93, which lead extends through opening 101 in plate 54, to terminal 102 of resistor 91 and thence by lead 103 to the protruding end 34 of bolt 32 to which end 31 of heater 27 is connected and to which it is secured by nut 104. Thus, thermostat 65 is shunted across resistor 91 which is in series with the main heating element 27, whereby upon opening of said thermostat and energization of said resistor 91, the current flowing through the circuit and hence through main heater 27 will be reduced.

The ohmic value of resistor 91 must be such that when it is cut into series with main heating element 27 by the opening of thermostat 65, the current flow through the said heater and resistor will be such that the resultant heat will be sufficient to keep the coffee infusion at drinking temperature, but insufficient to effect percolation.

Thus, for example, if heating element 27 has a value of 25 ohms, when it alone is in circuit, at a line voltage of say 115 volts, it will produce approximately 529 watts for heat. With resistor 91 in series with resistor 27 and illustratively having a value of 250 ohms, the heat produced by heating element 27 will be only 4.4 watts, and that produced by resistor 91 will be 44 watts, the total heat of 48.4 watts being insufficient to continue percolation.

Resistor 91 is of such wattage rating, illustratively in the order of 25 watts, that it will be over-driven by the 44 watts which it produces. As a result it will get very hot upon flow of current therethrough and it is so mounted with respect to thermostat 65 that it will conduct heat directly thereto to retain the thermostat 65 in open position once resistor 91 is energized and the resistor 91 is also mounted to radiate heat to the floor of the receptacle so as to heat the contents thereof.

To this end, thermostat 65, which incorporates metal spacer washers 108 physically to separate its component elements and suitable insulating washers 109 electrically to insulate such elements, is mounted upon a heat conducting rod 111, desirably of aluminum, which extends through an enlarged opening 112 in plate 54, with thermostat 65 mounted on one end of said rod and resistor 91 mounted on the other end of the rod which extends through the bore 113 of said resistor.

As shown in Fig. 3 the rod 111 is of reduced diameter at one end to form a shoulder 115 which abuts against the face of metal spacer washer 108 which is in contact with the end of bimetallic arm 67. As shown in Figs. 1 and 3, a heat insulating washer 116 is provided on rod 111 to heat insulate thermostat 65 from plate 54. An insulating washer 117 may also desirably be provided on rod 111 to heat insulate the latter from the lower end 26 of the heating element. By means of nuts 118 and 119 screwed on the threaded ends of rod 111 respectively, the thermostat, the resistor and the insulating washers are securely clamped together and retained on plate 54.

In operation, thermostat 65 initially derives heat substantially only from the walls of chamber 58 and this by radiation and convection. After resistor 91 is energized, thermostat 65 is heated both by the conducted heat from such resistor to bimetallic arm 67 as well as by such radiated and convected heat.

In the operation of the percolator, coffee is put into the basket and the liquid container filled with water and closed by a suitable cover in familiar manner, and knob 82 may be turned to set thermostat 65 for mild, medium, strong or extra strong coffee as desired.

In one particular model of percolator shown by way of illustration as having a capacity of eight cups, incorporating a cold water pump, and normally filled with tap water at a temperature of approximately 60 degrees F., the coffee infusion to be mild, under normal conditions of operation in the home, would percolate approximately 13 minutes and would attain a temperature of approximately 165 degrees F., and to be extra strong under like normal conditions would percolate approximately 23 minutes and would attain a temperature of approximately 205 degrees F., any intermediate strength of coffee requiring a period of percolation and raising the temperature of the diffusion between the limits stated.

With a source of current applied to terminal posts 41 and 46, heating element 27 will be energized, the circuit being from terminal 41, lead 38, through heating element 27, bolt 32, lead 103 to terminal 102 of resistor 91, lead 99 to lug 93 of thermostat 65, through arm 71 and normally engaging contacts 72, 73, arm 69, lug 92 and lead 94 to terminal 46. A circuit is also provided from lug 92 of thermostat 65 through lead 96 to terminal 98 of resistor 91. As thermostat 65 effects a short circuit across resistor 91, substantially only heating element 27 will limit the flow of current through the circuit, and heating element 27 in the illustrative embodiment herein shown, will produce approximately 529 watts for heat. Thus, in a relatively short time the water which entered well 49 through opening 51, will boil and as steam is generated it will lift the water up into tube 52 to discharge in conventional manner into the basket to start the percolation action.

However, as the water in the receptacle 10 is initially at approximately 60 degrees F., it will take some time for the entire body of water therein to reach the desired temperature. Consequently although the percolation is going on, the top 19 of the base 11, which serves as the floor of the receptacle 10, as well as the plate 54 affixed thereto will heat slowly having substantially the same temperature as the contents at the bottom of the receptacle.

In the heating operation, while the lower end of the main heating element 27 may become hot, this heat has no material effect on the operation of the thermostat in the control chamber 58, because the partition 54 serves as a barrier substantially to preclude transfer of heat to such chamber by radiation or convection from such heating element 27.

There is no effective conductive path for heat from the heating element to the thermostat 65, because its mounting rod 111 is effectively heat insulated from the heating element along its length by the encompassing un-energized resistor 91 and by the heat insulating washer 116 which also insulates the thermostat from conducted heat from plate 54.

Due to the usual commercial tolerance in the rating of the heating elements which may vary as much as plus or minus ten per cent from percolator to percolator, and as the heating elements are not precision wound, the portion of the element in one percolator which extends below the base of the receptacle may produce more heat than the corresponding portion of the element in another percolator, but since such heat is not radiated into the control chamber and does not reach the thermostat therein, such variation from percolator to percolator will not disturb the operation of the thermostat.

In addition, as in mass production assembly the distance of the heating element from the thermostat may vary from percolator to percolator, one heating element may radiate more heat directly to the thermostat than another heating element. However, since the heat from such heating element is not radiated into the control chamber and does not reach the thermostat therein, such variation in distance will not disturb the operation of the thermostat.

Varying line voltages normally encountered in the home cause the heat produced by the heating element of the percolator to vary correspondingly. Where, for example, the voltage should increase, the greater heat produced will force the water through the coffee at a more rapid rate to hasten the making of the coffee infusion. However, since such heat is not radiated into the control chamber and does not reach the thermostat therein, such variation will not effect premature operation of the thermostat, the latter functioning only when the contents of the receptacle has reached the desired temperature after a sufficient lapse of time to produce coffee of the desired strength.

Thus there is no likelihood that one heating element will radiate more heat to its thermostat than another heating element (a) due to the tolerance in the rating of the heating element from percolator to percolator, or (b) due to tolerance in the portion of the heater below the base of the receptacle, or (c) due to variations in commercial mass production assembly including tolerance in the distance of the heater from the thermostat, or (d) due to variation in the line voltage. Accordingly, if the thermostat is set to operate at a given temperature, then when it does operate, the coffee will be of the strength desired.

By reason of the isolation of the thermostat from substantially all heat except that from the relatively large metal radiating surface of the control chamber 58 which is directly heated by the liquid in the receptacle, the rate of temperature rise of the thermostat will follow closely that of the liquid in the receptacle. This is especially so as the loss of heat from said control chamber is minimized by the heat insulating liner 60 on the exposed surface thereof and in the particular model of percolator here described, a temperature differential of approximately 10 to 15 degrees F., may readily be maintained between the liquid in the receptacle and the air in the control chamber corresponding to the operative range between mild coffee and extra strong coffee. Thus, by originally setting the thermostats of all percolators of one given model in the factory to open at predetermined temperatures lower than that of the temperature of the infusion of the desired strength by such differential, the thermostat will accurately control the strength of the coffee infusion with assurance that under such normal operating conditions when the thermostat reaches its cut-off temperature, the coffee will be at the strength and temperature desired.

Even under adverse conditions of operation encountered in home use of the device, no material variation will occur in the strength of the coffee produced. Thus, for instance, in using the percolator in a room in which a window has been opened and a draft of air blows against the percolator, the receptacle contents will tend to cool. However, due to the large body of water therein which tends to retain its temperature, such cooling will be very gradual. If not for the heat insulating liner in the control chamber, as the latter is filled with air, it would tend to cool much more rapidly than the contents of the receptacle under such adverse condition with the result that the temperature differential between the air in the chamber and the liquid would increase and the thermostat therein would remain closed and percolation would continue even after the coffee infusion has attained the desired strength.

However, by reason of such heat insulating liner, although there may be somewhat more heat radiated from the control chamber when in a draft, this is substantially negligible and the relatively large radiating surface of the control chamber exposed to the heat of the liquid in the receptacle will speedily conduct such heat to maintain the air in the control chamber 58 at substantially the temperature differential desired with respect to the liquid in the receptacle without material variation. Hence the opening of the thermostat will be only slightly retarded so that the coffee infusion will not be substantially stronger than desired. And on the other hand when the percolator is used in a room adjacent a stove or radiator, if not for the heat insulating liner, the transfer of heat into the control chamber would cause the temperature therein to rise more rapidly than the rise of temperature of the liquid in the receptacle with the result that percolation would cut-off before the coffee infusion had attained the desired strength. By the use of the heat insulating liner, the transfer of heat into the control chamber is minimized so that the temperature differential with respect to the liquid will also be maintained substantially constant and hence the thermostat will open only slightly faster so that the coffee infusion will not be substantially weaker than desired.

If the thermostat 65 is set, for example, to make mild coffee, when the temperature of the liquid in chamber 58 reaches approximately 165 degrees F., thermostat 65 will open.

As resistor 91 will be in series with heater element 27, the current through the circuit, as heretofore pointed out, is materially reduced and consequently the heat produced by heater 27 will be reduced.

Although the 4.4 watts for heat produced by heater element 27 would not raise the temperature of the water in the pump enough to cause percolation, the 44 watts for heat produced by resistor 91 will overdrive such resistor and cause the latter to become hot, and the heat therefrom applied to rod 111 will be conducted therethrough to thermostat 65 to retain the latter in open position and such heat will also maintain the contents of the receptacle at a temperature of approximately 165 degrees F.

In like manner the thermostat 65 can be set to open when the temperature of the liquid reaches 175, 195 or 205 degrees F., to make medium, strong and extra strong coffee.

Once the thermostat 65 has been actuated, by reason of the heat conducting rod 111 which is energized by the close proximity of the hot resistor 91, it will remain open regardless of changes in the ambient temperature; and as long as thermostat 65 is thus kept open, the current flowing through the circuit will be so reduced that the heat produced will not be sufficient to cause resumption of percolation, so that once coffee of the desired strength has been brewed, the possibility of repercolation, which would make the coffee too strong, is precluded.

As the device is automatic in operation there is no need for the user to time the same or keep watch thereover. All that is required is to plug in the unit and turn the adjustment knob 82 for the desired strength of coffee.

When the circuit is opened, resistor 91 cools and thermostat 65 recloses so that the unit is automatically reset preparatory for the next use.

It is distinctly to be understood that the numerical values of ohmic resistances and resultant wattages, the periods of time, the temperatures and temperature differentials and in fact all other numerical values hereinabove stated are illustrative merely and would be predetermined for each model of percolator made according to the present invention and the component parts thereof.

The performance of a percolator of the present invention will depart from the figures illustratively herein stated by modification in the gauge and type of metal used for the body or base, by change in shape or size or volume or capacity, or by substitution of a heater of different rating, but all percolators of any one model as fabricated and assembled in mass production, will perform substantially uniformly in the manner desired, substantially regardless of variations in commercial mass production assembly including tolerances in the heater and in the positioning of the control unit and the like, and this without the need for adjustment or regulation.

The thermostat incidentally functions as a safety device to prevent destruction of the heating element 27, the resistor 91 and the percolator itself, in the event the circuit is closed with insufficient or no liquid in the receptacle. In that event the temperature of the receptacle would quickly rise to that to which the thermostat has been set and the thermostat 65 will open, greatly reducing the current by placing resistor 91 in series with the main heating element 27 which will keep the receptacle at a safe temperature not exceeding a maximum of approximately 205 degrees F.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. In an electric percolator of the type comprising a receptacle having a floor, a base therefor having a cavity therein, and an electric circuit including a heating element for said receptacle; the combination therewith of a partition of heat conducting material in said cavity extending completely thereacross and forming a control chamber therein, said partition being affixed to said floor, extending outwardly therefrom, and being in heat conductive relation to said receptacle so as to derive heat from the contents thereof and substantially barring transfer of heat by radiation, by conduction and by convection from said heating element to said control chamber, a heat responsive switch mounted on said partition in said control chamber and spaced from said floor, said switch being connected to control the operation of said heating element, and a heat insulating mount for said switch, whereby the switch derives heat substantially solely from the heat of the receptacle contents.

2. The combination set forth in claim 1 in which a resistor is provided in heat transfer relation to the floor of said receptacle and to said switch and normally shunted by the latter whereby upon opening of said switch, said resistor will be energized, and the radiated heat therefrom applied to the floor of the receptacle, and a rigid member conducting heat from said resistor to said switch to retain the latter in open condition.

3. The combination set forth in claim 1 in which a rigid heat conducting member extends through said partition and mounts said switch at one end thereof and said resistor is mounted on the other end of said member in said cavity externally of said control chamber, said resistor being normally shunted by said switch, whereby upon opening of said switch said resistor will be energized and the heat therefrom radiated to the floor of said cavity and conducted through said conducting member to said switch to retain the latter in open condition.

4. The combination set forth in claim 1 in which said partition is substantially upright in said cavity and extends completely across the latter interposed between said heating element and said heat responsive switch, the lateral edges of said partition substantially conforming to the contour of the wall of said cavity and slightly spaced therefrom.

5. In an electric percolator of the type comprising a receptacle having a floor, a base for said receptacle having a cavity therein, an electric circuit including a heating element for said receptacle; the combination therewith of a substantially upright partition of heat conductive material extending completely across said cavity and affixed to the floor of said receptacle so as to conduct heat from the contents thereof, said partition defining a control chamber within said cavity exteriorly of said heating element, said partition serving substantially to bar transfer of heat by radiation, by conduction and by convection from said heating element to said control chamber, said control chamber having a wall exposed to the exterior of the percolator, heat insulation means associated with said wall to impede the transfer of heat with respect to said control chamber, a heat responsive switch mounted on said partition in said control chamber and spaced from said floor, said switch being connected to control the operation of said heating element, and a heat insulating mount for said switch.

6. In an electric percolator of the type comprising a receptacle having a floor, a base for said receptacle having a cavity therein, an electric circuit including a heating element for said receptacle; the combination therewith of a substantially upright partition of heat conductive material extending completely across said cavity and affixed to the floor of said receptacle so as to conduct heat from the contents thereof, said partition defining a control chamber within said cavity exteriorly of said heating element, said partition serving substantially to bar transfer of heat by radiation, by conduction and by convection from said heating element to said control chamber, said control chamber having a wall exposed to the exterior of the percolator, heat insulation means associated with said wall to impede the transfer of heat with respect to said control chamber, a heat responsive switch mounted in said control chamber connected to control the operation of said heating element, a heat insulating mount for said switch, a resistor in said cavity exteriorly of said control chamber in heat transfer relation to the floor of said receptacle and to said switch and normally shunted by the latter whereby upon opening of said switch, said resistor will be energized and the radiated heat therefrom applied to the floor of said receptacle, and means conducting heat from said resistor to said switch to retain the latter in open condition.

7. In an electric percolator of the type comprising a receptacle having a floor, a base for said receptacle having a cavity therein, and an electric circuit including a heating element for said receptacle; the combination therewith of a substantially upright partition of heat conductive material extending completely across said cavity and affixed to the floor of said receptacle and depending therefrom so as to conduct heat from the receptacle contents, said partition defining a control chamber within said cavity exteriorly of said heating element, said partition serving substantially to bar transfer of heat by radiation, by conduction and by convection from said heating element to said control chamber, an adjustable heat responsive switch in said control chamber, a heat insulating mount for said switch, a resistor in said cavity exteriorly of said control chamber in series with said heating element and normally shunted by said heat responsive switch, said resistor being in heat transfer relation to the floor of said receptacle, rigid heat conducting means extending through said partition and mounting said switch and said resistor on each side thereof respectively, whereby upon opening of said switch said resistor will be energized and the heat therefrom radiated to the floor of said receptacle and conducted through said heat conducting means to said switch to retain the latter in open position.

EMIL KOLISCH.

REFERENCES CITED

The following references are of record in the file of this patent:

UNITED STATES PATENTS

| Number | Name | Date |
|---|---|---|
| 1,704,479 | Kercher et al. | Mar. 5, 1929 |
| 1,920,013 | Green | July 25, 1933 |
| 1,947,426 | Smith | Feb. 13, 1934 |
| 1,971,154 | Green | Aug. 21, 1934 |
| 1,984,129 | Green | Dec. 11, 1934 |
| 1,990,351 | Shroyer | Feb. 5, 1935 |
| 1,990,546 | Hubbard | Feb. 12, 1935 |
| 2,076,096 | Samuels et al. | Apr. 6, 1937 |
| 2,168,158 | Hall | Aug. 1, 1939 |
| 2,179,936 | Keene | Nov. 14, 1939 |
| 2,209,832 | Schurig | July 30, 1940 |
| 2,212,100 | Keaton | Aug. 20, 1940 |
| 2,281,319 | Newell | Apr. 28, 1942 |
| 2,399,423 | Bletz | Apr. 30, 1946 |
| 2,522,718 | Huck | Sept. 19, 1950 |